US008579228B2

(12) United States Patent
Monleau et al.

(10) Patent No.: US 8,579,228 B2
(45) Date of Patent: Nov. 12, 2013

(54) TWIN ROTOR FLYING VEHICLE

(75) Inventors: Jean-Marie Monleau, Les Orres (FR); Vincent Vilbois, Voisins-le-Bretonneaux (FR)

(73) Assignee: Infotron, Massy (FR)

( * ) Notice: Subject to any disclaimer, the term of this patent is extended or adjusted under 35 U.S.C. 154(b) by 478 days.

(21) Appl. No.: 12/682,276

(22) PCT Filed: Oct. 10, 2008

(86) PCT No.: PCT/FR2008/001429
§ 371 (c)(1),
(2), (4) Date: Oct. 15, 2010

(87) PCT Pub. No.: WO2009/087292
PCT Pub. Date: Jul. 16, 2009

(65) Prior Publication Data
US 2011/0024554 A1    Feb. 3, 2011

(30) Foreign Application Priority Data
Oct. 12, 2007    (FR) ...................................... 07 58249

(51) Int. Cl.
*B64C 27/08* (2006.01)
(52) U.S. Cl.
USPC .................................... 244/17.23; 244/17.11
(58) Field of Classification Search
USPC ..................................................... 244/17.23
See application file for complete search history.

(56) References Cited

U.S. PATENT DOCUMENTS

| | | | | |
|---|---|---|---|---|
| 3,572,616 | A * | 3/1971 | Ulisnik | 244/17.23 |
| 4,123,018 | A * | 10/1978 | Tassin de Montaigu | 244/17.23 |
| 8,052,081 | B2 * | 11/2011 | Olm et al. | 244/17.23 |
| 2003/0136875 | A1 * | 7/2003 | Pauchard | 244/17.11 |
| 2004/0129827 | A1 * | 7/2004 | Perlo et al. | 244/7 B |
| 2004/0129833 | A1 * | 7/2004 | Perlo et al. | 244/7 |
| 2007/0164149 | A1 * | 7/2007 | Van de Rostyne | 244/17.21 |
| 2008/0245924 | A1 * | 10/2008 | Arlton et al. | 244/17.13 |
| 2009/0008499 | A1 * | 1/2009 | Shaw | 244/17.23 |
| 2009/0045295 | A1 * | 2/2009 | Lundgren | 244/7 |
| 2009/0250549 | A1 * | 10/2009 | Wiggerich | 244/17.11 |
| 2010/0025526 | A1 * | 2/2010 | Lawrence | 244/17.23 |
| 2010/0044499 | A1 * | 2/2010 | Dragan et al. | 244/17.23 |
| 2010/0108801 | A1 * | 5/2010 | Olm et al. | 244/17.23 |
| 2010/0243793 | A1 * | 9/2010 | Jermyn | 244/17.23 |
| 2011/0006166 | A1 * | 1/2011 | Arlton et al. | 244/7 A |
| 2012/0138732 | A1 * | 6/2012 | Olm et al. | 244/17.23 |

\* cited by examiner

*Primary Examiner* — Christopher P Ellis
*Assistant Examiner* — Medhat Badawi
(74) *Attorney, Agent, or Firm* — Seyfarth Shaw LLP; Brian Michaelis (57) ABSTRACT

A flying vehicle is provided that comprises first and second rotors respectively mounted in rotation about first and second rotation axes, the first rotor including a first group of blades extending in a first blade plane and the second rotor including a second group of blades extending in a second blade plane, each of the first and second rotors being rotated by a driving means of the machine. The driving means includes at least one engine arranged between said rotors and between said first and second blade planes.

18 Claims, 5 Drawing Sheets

TWIN ROTOR FLYING VEHICLE

RELATED CASE INFORMATION

This application claims benefit of PCT Application No. PCT/FR08/01429 filed Oct. 10, 2008 which claims benefit from French Application No. 0758249 filed Oct. 12, 2007.

FIELD OF THE INVENTION

The present invention generally relates to the field of flying vehicles including two counter-rotating rotors (rotating in opposite directions).

BACKGROUND OF THE INVENTION

More particularly, the invention relates to a flying vehicle including first and second rotors respectively mounted in rotation about first and second axes of rotation, the first rotor including a first group of blades extending in a first blade plane and the second rotor including a second group of blades extending in a second blade plane, the first and second rotors each being driven into rotation by driving motor means of the machine.

Flying vehicles having two counter-rotating rotors have the advantage relatively to flying vehicles with only one rotor with a vertical axis (conventional helicopters) of not requiring an anti-torque additional rotor for controlling the yaw generated by the rotation of the rotor with a vertical axis.

Figure 1:
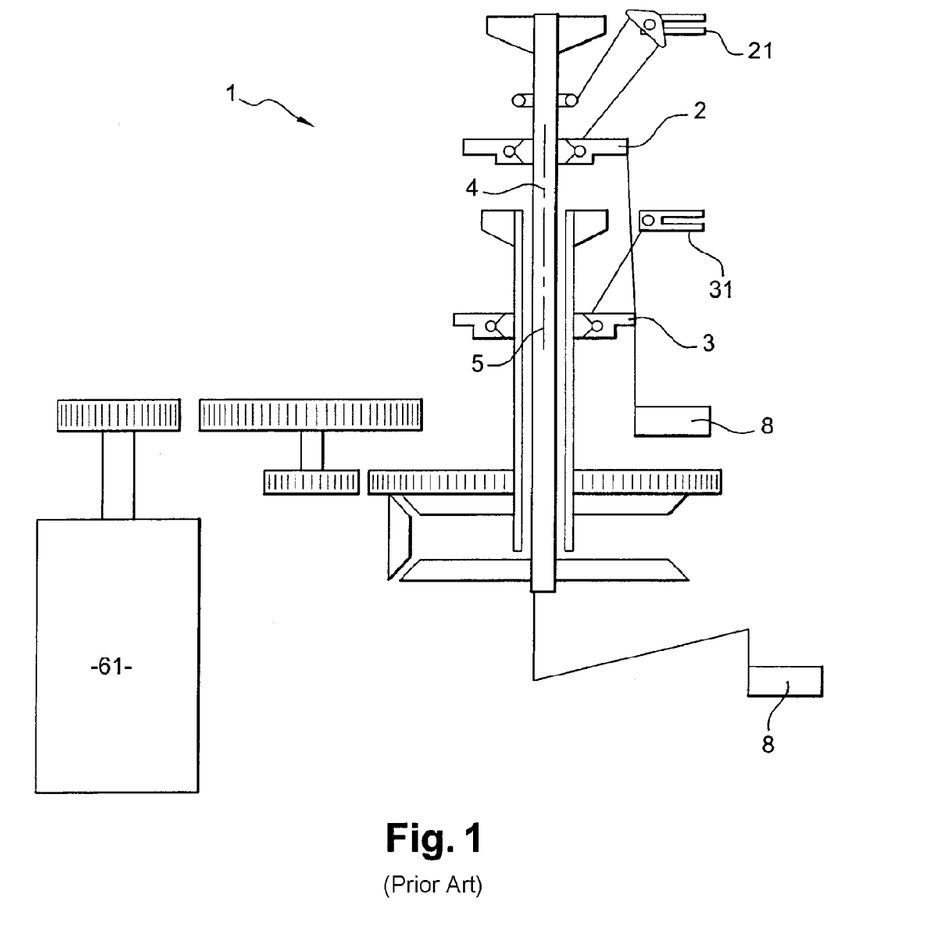
FIG. 1 illustrates a schematic view of a flying vehicle of the prior art provided with an motor positioned under the rotors.

A vehicle of the prior art of the type defined earlier is, for example, shown in FIG. 1. This vehicle includes two rotatably mounted rotors about two coinciding axes of rotation. Each of these rotors bears a group of blades with variable pitches.

The vehicle includes a single motor for driving into rotation each of the two rotors, one of the rotors having a hollow shaft in order to let through the shaft for driving into rotation the second rotor in this hollow shaft, both of the shafts rotating in opposite directions.

In this context, the object of the present invention is to propose a flying vehicle with two rotors having increased maneuverability as compared with the flying vehicle of FIG. 1.

For this purpose, the flying vehicle of the invention moreover according to the generic definition given by the preamble as defined earlier, is essentially characterized in that said driving means include at least one motor positioned between said rotors and between said first and second blade planes.

The fact of placing the motor between the rotors and between the blade planes allows the centre of gravity of the vehicle to be brought closer to the space located between the first and second blade planes and the axes of rotation of the rotors.

Further, the masses of the vehicle are thus brought closer to its centre of gravity which is located between the rotors and in proximity to the axes of rotation of the rotors. The inertia of the flying vehicle relatively to its centre of gravity is therefore reduced thereby improving the maneuverability of the vehicle.

By means of this relatively high and centered position relatively to the rotors of the centre of gravity, the maneuverability of the vehicle is improved. Further, the fact that the motor is found between the blade planes of the rotors, allows reduction in the wind resistance of the vehicle outside the space between the blade planes, the result of this is increased stability of the vehicle to lateral wind gusts.

It is also possible to ensure that said at least one motor has a size and a location such that it (the motor) is comprised inside a cylinder-shaped space with maximum volume coaxial with said first axis of rotation and with a radius of less than two thirds of the length of a blade of said first rotor.

By this definition of the maximum volume of the motor, it is possible to specify its maximum size and its location opposite to the first rotor so as to obtain a sufficiently maneuverable flying vehicle.

The space located between the rotors at their respective peripheries (i.e. at the ends of the blades) is free of any obstacle so that an airflow may circulate between the rotors in a direction parallel to at least one of the planes of the rotors (this flow notably exists during horizontal displacements of the flying vehicle).

It is also possible to ensure that the motor further includes a case encompassing said driving means of the vehicle, this case being comprised in said maximum volume space with a cylindrical shape.

The use of the case which is preferentially aerodynamic allows increase in the yield of the rotors in terms of vertical thrust by limiting the perturbations between these rotors which are caused by the presence of the driving means.

For example, it may be ensured that the blades borne by the rotors are blades with variable pitches.

By positioning the motor between the blade planes, it is easier to control the tilt of the blades since the blades of both rotors are accessible from the space between the blade planes without having to use a blade pitch control mechanism passing through a rotor in order to control the pitch of the blades of the other rotor.

For example, it may be ensured that said first rotor includes a first crown which extends around said first axis of rotation and which is bound in rotation about the first axis of rotation relatively to said first group of blades while being mobile relatively to the first group of blades, at least some of the blades of the first group of blades being mechanically connected to said first crown so that the relative displacement of this first crown relatively to the first group of blades causes a change in incidence of the blades mechanically connected to said first crown, relatively to said first axis of rotation.

For example, it may be ensured that said second rotor includes a second crown which extends around said second axis of rotation and which is bound in rotation about the second axis of rotation relatively to said second group of blades while being mobile relatively to the second group of blades, at least some of the blades of the second group of blades being mechanically connected to said second crown so that the relative displacement of the second crown relatively to the second group of blades causes a change in incidence of the blades mechanically connected to said second crown, relatively to said second axis of rotation.

The incidence of a blade relatively to the axis of rotation of the rotor, to which this blade belongs, is the pitch of this blade. This pitch allows determination of the lifting force generated by this blade during the rotation of the rotor. The use of a crown for controlling the incidence of the blades of a rotor is advantageous since it is possible to control the pitch of each blade during its rotation and therefore the lift of the rotor by orienting and positioning this crown relatively to the blade plane of the rotor to which it belongs.

It is therefore possible to control the collective pitch of the blades of this rotor and/or the individual pitch of each blade of this rotor by simply positioning the crown.

SUMMARY OF THE INVENTION

According to the selected embodiment, it is possible in a first case to ensure that the first and/or the second crown is (are) mounted so as to always extend in one or more planes perpendicular relatively to the first and/or second axes, this/these crown(s) then being only rotationally mobile about the first and/or the second axe and translationally mobile along these same first and/or axes, in a second case (an alternative to the first case), to ensure that the first and/or the second crown are mounted in a swiveling way around an axis point specific to each crown sliding along said first and/or second axis.

In each of these cases, the first crown is slidably mounted along the first axis and/or the second crown is slidably mounted along the second axis.

In the first case, the crown only moves in translation along the axis of rotation around which it extends and in rotation about this same axis.

In this first case, the displacement of the crown then causes a collective pitch variation of the blades of the group of blades to which is connected this crown.

Thus at a given instant, all the blades of a same group of blades will have identical pitch.

In the second case, the crown moves in translation along the axis of rotation around which it extends, in rotation about this same axis and is capable of swiveling around a point sliding along this same axis.

In this second case, the crown may then extend in a plane which is not parallel to the plane in which extend the blades of a same group of blades.

Thus, the pitch of a blade of a group of blades not parallel to the crown to which it is bound may vary during the rotation of the rotor. In this case, all the blades of the rotor therefore do not necessarily have the same pitch value. With the tilt of the crown relatively to the plane in which the blades extend, a difference in lift may be generated between the opposite sides of the rotor which generates a pivoting and forward movement of the vehicle by simply tilting a crown.

For example, it may be ensured that the mechanical connection between the first crown and the first group of blades includes at least one first rotor connecting rod and that the mechanical connection between the second crown and the second group of blades includes at least one second rotor connecting rod.

For example, it may be ensured that said first and second crowns are positioned between said first and second planes.

With this embodiment, it is possible to promote positioning of the centre of gravity of the vehicle between the blade planes which increases its maneuverability.

This positioning of the first and second crowns between the planes of the first and second groups of blades is advantageous since it allows centralization of the control for orienting the blades of both rotors in a single central area of the vehicle.

For example, it may be ensured that said motor positioned between said first and second planes of blades is mechanically connected to said first and second rotors so as to drive them into rotation in respectively opposite directions.

With this embodiment, it is possible to obtain synchronized variation of the speed of the rotors by only controlling the speed of one motor.

Alternatively to this last embodiment, it may for example be ensured that the flying vehicle includes first and second motors positioned between said first and second rotors, the first motor being connected to the first rotor so as to drive it into rotation about the first axis of rotation and the second motor being connected to the second rotor in order to drive it into rotation about the second axis of rotation.

With this embodiment, it is possible to independently control the speed of rotation of each rotor by adjusting the speed of each motor.

For example, it is possible to ensure that said first and second crowns are connected to each other with a mechanical means for connecting the crowns, adapted so as to maintain them parallel with each other.

By such a means for connecting the crowns, the crowns are always oriented parallel to each other including during their displacement relatively to the first and/or second axes of rotation, the result is a symmetry of variation of the blade pitches on both rotors. Thus, variation of pitch on one rotor is accompanied by a pitch variation on the other rotor which limits the involuntary yaw effects of the vehicle consecutive to pitch variation.

Such a means for connecting the crowns, for example, is formed by several rods associating the crowns with each other so that they remain always parallel with each other during their displacement.

This means for connecting the crowns may also be formed by a first group of position-controlled servomotors for controlling the positioning of the first crown, a second group of position-controlled servomotors for controlling the positioning of the second crown and an electronic servocontrol adapted for simultaneously servo-controlling the servomotors of the first and second groups so that the latter guarantee that the first and second crowns are positioned parallel with each other.

For example, it may be ensured that the flying vehicle includes at least one adapted servomotor for controlling the displacement of at least one of said crowns.

For example, it is possible to ensure that said first and second rotors are hollow and that the vehicle includes a mast extending through hollows of the first and second rotors.

This embodiment with a mast passing through both rotors gives the possibility of having structural rigidity of the vehicle which promotes control accuracy of the vehicle.

BRIEF DESCRIPTION OF THE DRAWINGS

Other features and advantages of the invention will become clearly apparent from the description which is made hereafter, as an indication and by no means as a limitation, with reference to the appended drawings, wherein.

DETAILED DESCRIPTION OF THE INVENTION

Figure 2:
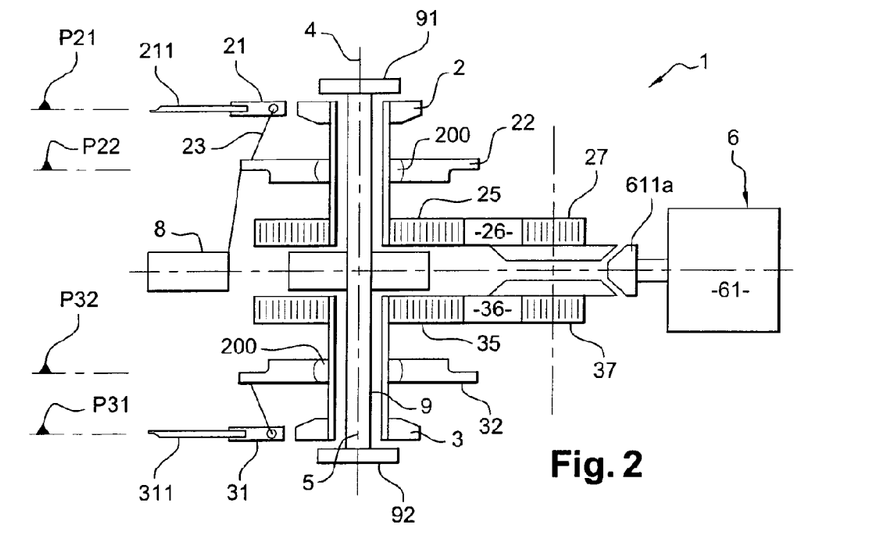
FIG. 2 illustrates a schematic view of a flying vehicle according to the invention provided with the single motor for driving both rotors.
Figure 3:
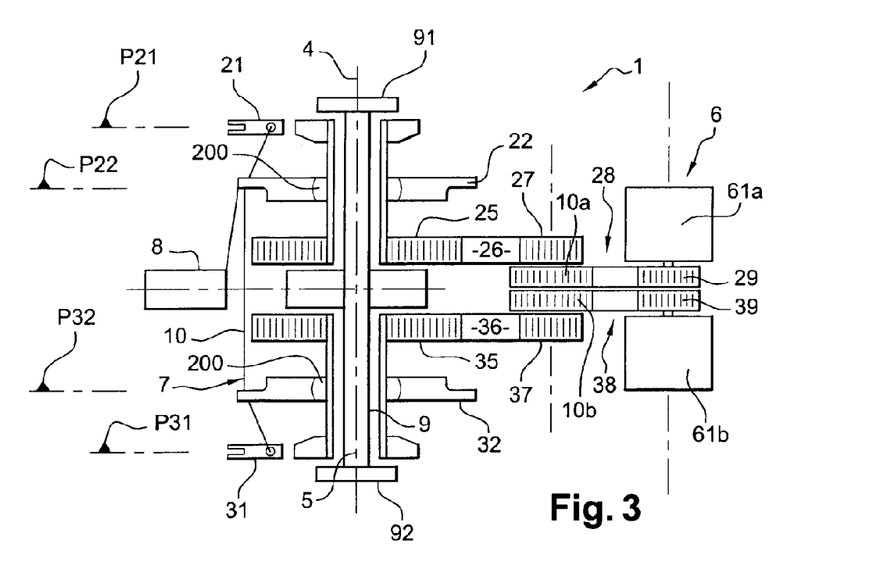
FIG. 3 illustrates a schematic view of a flying vehicle according to the invention provided with two motors each driving one rotor.
Figure 4:
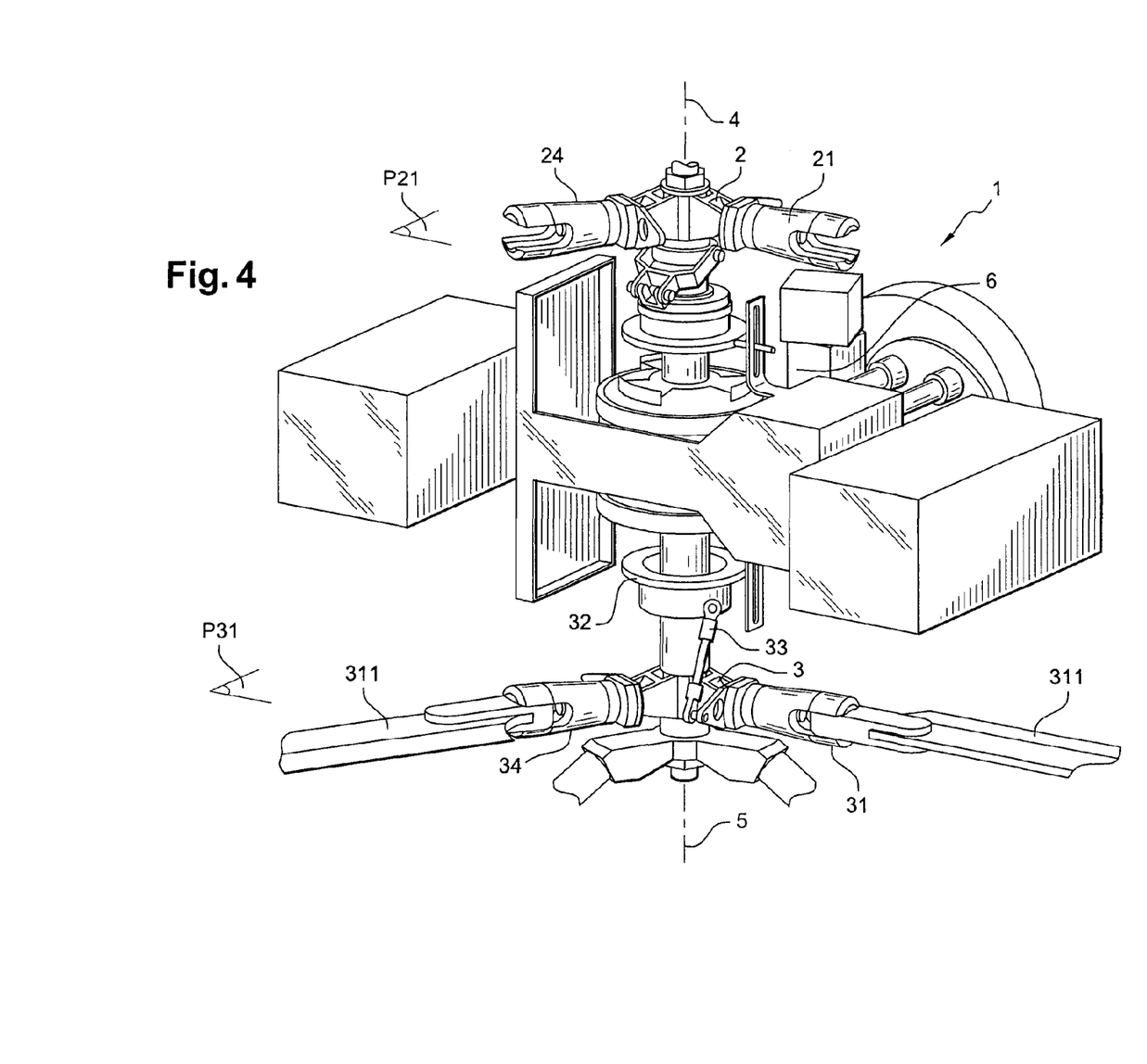
FIG. 4 illustrates a perspective view of the flying vehicle of the invention.

The flying vehicle 1 of FIGS. 2, 3, and 4 includes first and second rotors 2, 3, respectively mounted in rotation about the first and second axes of rotation 4, 5, which substantially coincide with each other.

The first rotor 2 bears a first group of blades 21 extending along a first blade plane P21 which is substantially perpendicular to the first axis of rotation 4.

The second rotor 3 bears a second blade group 31 extending along a second blade plane P31 which is substantially perpendicular to the second axis of rotation 5.

The first rotor 2 includes a part 24 for supporting the blades 211 of the first group of blades 21. Symmetrically, the second rotor 3 includes a part 34 for supporting the blades 311 of the second group of blades 31.

Each of the blades 211 of the first group of blades 21 is rotatably mounted on the supporting part 24 about an axis of rotation specific to each blade, each of the axes of rotation specific to each blade substantially extending in the blade plane P21.

Symmetrically, each of the blades 311 of the second group of blades 31 is rotatably mounted on the supporting part 34 about an axis of rotation specific to each blade 311, each of the axes of rotation specific to each blade substantially extending in the blade plane P31.

The first and second groups of blades have a same number of blades (in this case, 3 blades per rotor) and these blades are selected so that the lifting forces generated by the blades of the first group are substantially equivalent to the lifting forces generated by the blades of the second group of blades for equivalent speeds of rotation of the rotors.

The first and second rotors 2, 3 are driven into rotation by driving means 6 of the vehicle 1 which are positioned between the first and second blade planes P21, P31. These driving means 6 either include a single motor (61) driving both rotors 2, 3 as in FIG. 2 or two motors 61a and 61b each driving only one of the two rotors 2, 3.

The first and second rotors 2, 3 are hollow, these hollows formed in the rotors open out so that each of the two rotors 2, 3 is completely crossed by a mast 9 used as a structure for the vehicle.

The driving means 6 are supported by the mast 9 and the ends of the mast 9 are used as an interface for loads 91, 92 for attaching the payload of the vehicle.

Ideally, the mast 9 is hollow in order to let through wirings of the equipment located above and below the vehicle 1. With this architecture, it is possible to concentrate the whole power train, the drive as well as the control electronics in an ovoid-shaped volume of revolution located between the rotors.

Figure 5:
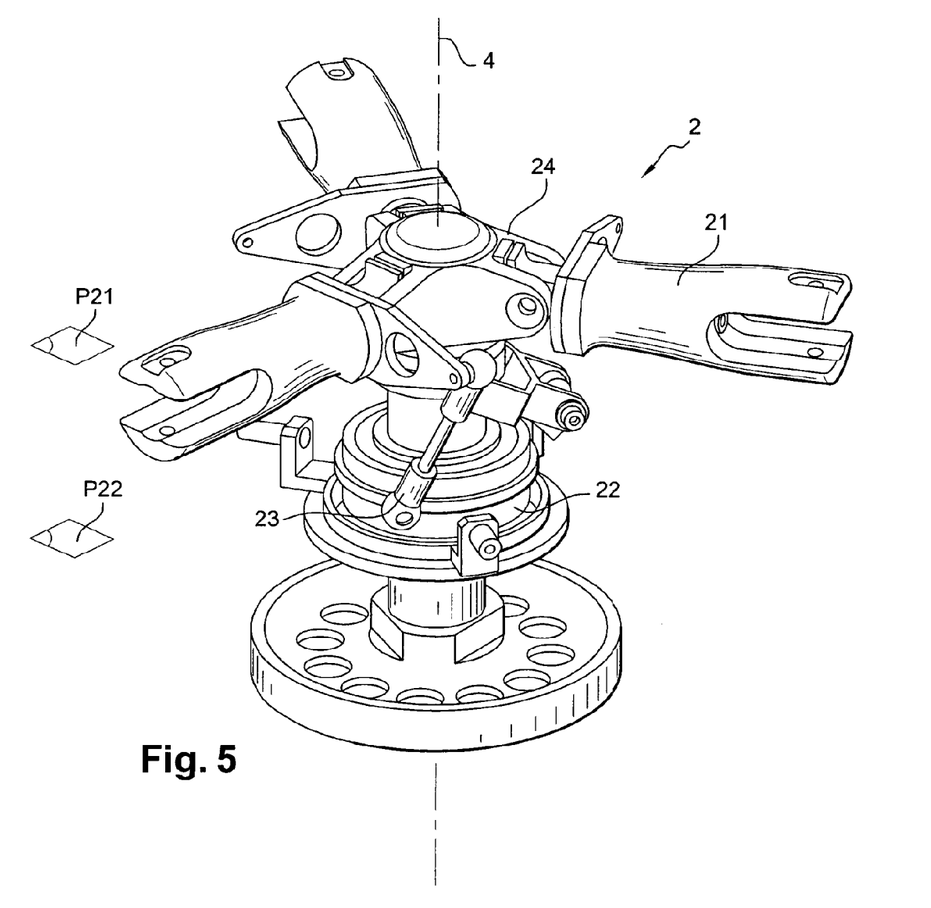
FIG. 5 illustrates a detailed perspective view of the first rotor of the flying vehicle of the invention.

The first rotor 2 includes a first crown 22 extending around said first axis of rotation 4, this crown being indexed in rotation with the first group of blades 21 about the first axis of rotation 4.

This first crown 22 is further translationally mobile with regard to the first group of blades 21 along said first axis of rotation 4.

The blades 211 of the first group of blades 21 are mechanically connected to said first crown 22 via connecting rods of the first rotor 23. Each of these connecting rods 23 is jointed at one end on a point of the first crown 22 and at another end on a point of a blade 211 which is distant from the axis of rotation specific to this blade 211.

In this way, the relative displacement of the first crown 22 relatively to the first group of blades 21 causes a variation of incidence of the blades 211 connected through the connecting rods.

The second rotor 3 includes the second crown 32 extending around said second axis of rotation 5, this crown 32 being indexed in rotation with the second group of blades 31 about the second axis of rotation 4.

This second crown 32 is further translationally mobile with regard to the second group of blades 31 along said second axis of rotation 5.

The blades 311 of the second group of blades 31 are mechanically connected to said second crown 32 via connecting rods of the second rotor 33. Each of these connecting rods of the second rotor 23 is jointed at one end on a point of the second crown 32 and at another end on a point of a blade 311 which is distant from the axis of rotation specific to this blade 311.

In this way, the relative displacement of the first crown 22 relatively to the first group of blades 21 causes a variation of incidence of the blades 211 connected through the connecting rods 23.

The first and second crowns have shapes of planar disks which are commonly called cyclic plates in the field of building rotors for helicopters.

These first and second crowns 22, 32 are positioned between said first and second blade planes P21, P31 and their respective positions with regard to the first and second groups of blades 21, 31 are generated with servomotors 8 implanted in the space between the blade planes P21, P31.

The first and second crowns 22 and 32 respectively extend in respective planes of the first and second crowns P22 and P32. Mechanical means for connecting the crowns 7 are able to ensure that the crowns always remain parallel with each other and this even if these crowns are displaced and/or oriented with regard to the blade planes P22, P32.

In the embodiment of FIG. 2, the vehicle 1 includes a single motor 61 for driving both rotors 2, 3 into rotation in opposite directions. This motor 61 is a heat engine and the speeds of rotation of the rotors are then identical with each other (in absolute value) and are of opposite directions of rotation.

In this embodiment of FIG. 2, the variation of the total lift of the vehicle and/or of its yawing is mainly accomplished by varying the angle of the blades rather than varying the speed of rotation of the engine 61. Indeed it is easier to control the incidence angle of the blades than accurately control variations of speed of a heat engine. The heat engine is therefore preferentially controlled so as to rotate at constant speed.

In this embodiment, the first rotor 2 bears a pulley 25 for driving the first rotor 2 centered on the first axis of rotation 4 and the second rotor 3 bears a pulley 35 for driving the second rotor 3 centered on the second axis of rotation 5.

A first rotor belt 26 is engaged between the driving pulley 25 and a first intermediate pulley 27, the latter being provided with a conical gear meshing with a shaft end cog 611 of the engine 61.

Symmetrically, a second rotor belt 36 is engaged between the driving pulley 35 and a second intermediate pulley 37, the latter also being provided with a conical gear meshing with the shaft end cog 611 of the engine 61.

In this embodiment, each crown includes a specific central ball-joint 200 comprising a passage for a tube of the axis of rotation of the rotor. Each of the central ball-joints allows the crown to swivel around a point through which passes the axis of rotation of the rotors 4, 5. These tube passages formed in the central ball joints allow the ball-joints to slide along the rotor axes of rotation 4, 5.

Three servomotors 8 are laid out at 120° at the periphery of the first crown 22. Also, three other servomotors 8 are arranged at 120° at the periphery of the second crown 32. With these groups of servomotors, the distance between each crown 22, 32 of the blade plane P21, P31 of the rotor bearing this crown as well as the orientation of the crown plane P22 and P32 with regard to this blade plane P21, P31, may be controlled.

The positioning of each crown is therefore controlled by an electronic computer connected to the six servomotors 8.

This computer is programmed so that the crown planes P22 and P32 are always parallel with each other. These servomotors allow generation of a collective differential (collective pitch differential between the rotors) which either generates a yaw torque or not. Failure of a servomotor does not cause falling of the craft since the computer is always able to control the collective pitch of the rotor, for which the servomotors are operating properly.

FIG. 3 shows an alternative embodiment of the invention to the one of FIG. 2. Here, the vehicle has two motors 61*a* and 61*b* each driving a single rotor 2, 3, these rotors rotating in opposite directions. These first and second motors 61*a* and 61*b* are positioned between said first and second rotors 2, 3 and between the planes P21 and P31. In this embodiment, the motors 61*a* and 61*b* are electric motors and the respective speeds of rotation of the rotors are adjusted by controlling each motor 61*a*, 61*b*.

The lifting force of the vehicle and the yawing depend on the respective speeds of rotation of the motors and on the respective incidences of the blades of the rotors.

The speed of each electric motor 61*a*, 61*b* as well as its acceleration and deceleration may be accurately controlled, consequently, it is easy to control the yaw of the vehicle by acting on the difference in speeds of rotation between the rotors and the vertical displacement movement of the vehicle by acting on the speeds of both motors.

By means of these motors alone with which the yawings may be handled, the crowns may be connected to each other translationally along the rotor axes 4 and 5 so that they always move simultaneously. This possibility is the one shown in FIG. 3 where connecting rods 10 connect the crowns with each other.

In this embodiment, 3 servomotors 8 may be used, distributed at 120° on the periphery of one of the crowns in order to control the simultaneous displacement of both crowns. In this case, there is no collective differential control since the collective pitch of the blades of the first rotor 2 is always equal to the collective pitch of the blades of the second rotor 3. With this embodiment, it is possible to only have three servomotors, which is economical.

In an alternative embodiment, 2 servomotors mounted at the periphery of one of the crowns will only be used, while using a fixed abutment at the periphery of this same crown. Both servomotors allow this crown to be displaced with regard to this fixed abutment and tilted relatively to this abutment.

In a last alternative embodiment, 6 servomotors (3 per crown placed at its periphery and positioned at 120° relatively to each other) are used, coupled with one or two electric motors 61 and in this case the crowns are translationally mobile independently of each other (no rod is then used).

This last embodiment is particularly tolerant to failures of the servomotors and the servomotors are less mechanically loaded than in the other embodiments. Operating safety is therefore better.

Finally, as shown in FIG. 3, the flying vehicle of the invention may further include a speed-reducing stage 28, 38 interposed between each intermediate pulley 27, 37 and the shaft(s) of the motor(s).

The reduction stage includes a first driven pulley 100*a*, 100*b* assembled on the intermediate pulley 27, 37 and the shaft of each motor has a shaft end pulley 29, 39 engaged with the intermediate pulley via a transmission belt. This embodiment is for example used when the vehicle includes two motors.

Figure 6A:
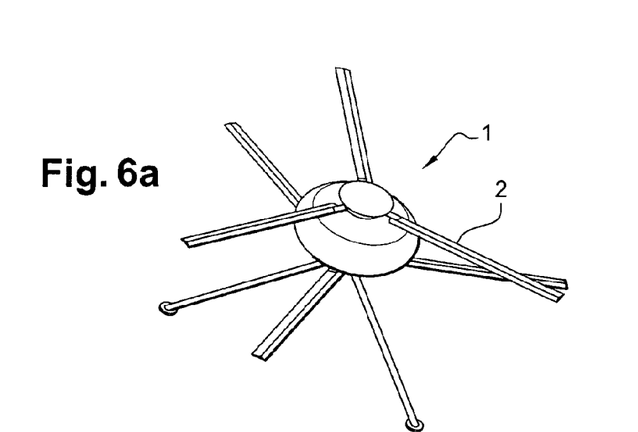
FIG. 6a is a perspective view of the flying vehicle of the invention provided with a case positioned around the driving means.
Figure 6B:
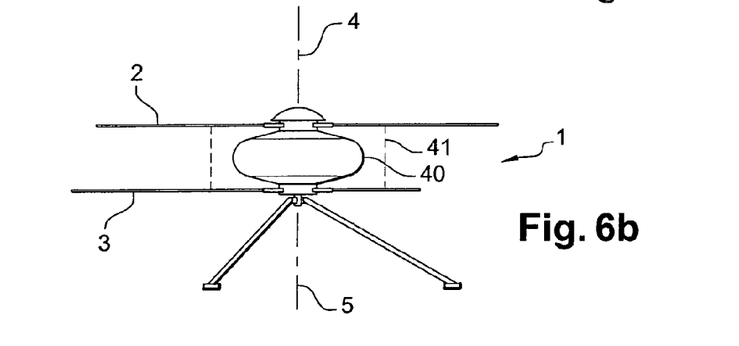
FIGS. 6b and 6c are side and top views of the vehicle of FIG. 6a respectively.
Figure 6C:
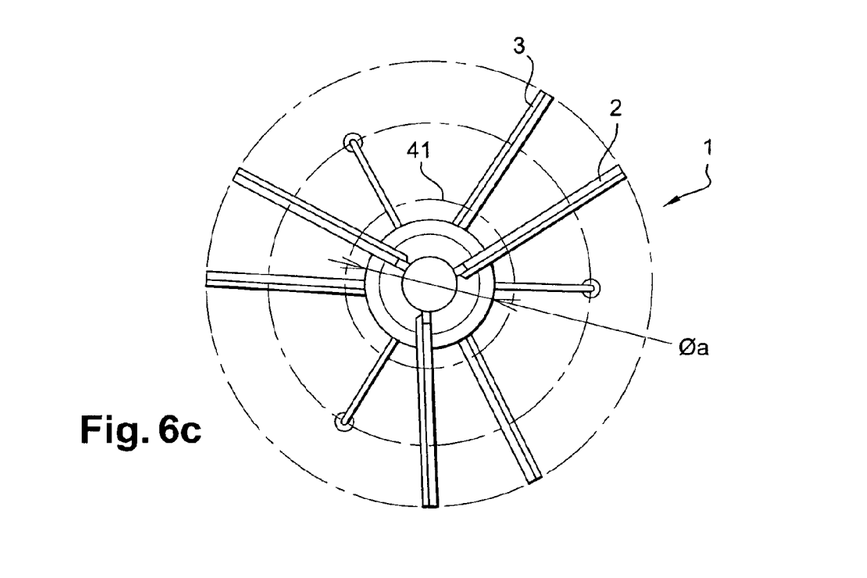

As this is seen in FIGS. 6*a*-6*c*, the flying vehicle 1 has a (preferentially aerodynamic) case completely encompassing the driving means which in this case comprise two motors.

In order to obtain flight performance of the vehicle, it is ensured that this case and therefore the driving means which it encompasses, are comprised inside a cylinder-shaped space with a volume 41 as reduced as possible and for which the radius in this case is less than two thirds of the blade length.

What is claimed is:

1. A flying vehicle comprising:
   a first rotor mounted so as to rotate about an axis of rotation;
   first blades extending from the first rotor along a first blade plane;
   a second rotor mounted so as to rotate about the axis of rotation;
   second blades extending from the second rotor along a second blade plane;
   driving means for driving the vehicle, the driving means including one motor positioned between the first and second rotors and between the first and second blade planes, the motor mechanically connected to the first and second rotors so as to drive the first and second rotors into rotation in respectively opposite directions;
   a first crown disposed around the axis of rotation and adapted to rotate about the axis of rotation with the first blades while being mobile relative to the first blades, at least some of the first blades being mechanically connected to the first crown so that relative displacement of the first crown relative to the first blades causes a variation of incidence of the at least some of the first blades; and
   a second crown disposed around the axis of rotation and adapted to rotate about the axis of rotation with the second blades while being mobile relative to the second blades, at least some of the second blades being mechanically connected to the second crown so that relative displacement of the second crown relative to the second blades causes a variation of incidence of the at least some of the second blades.

2. The vehicle according to claim 1, wherein the motor has a size and a location such that it is comprised inside a cylinder-shaped space of maximum volume coaxial with the axis of rotation and with a radius of less than two thirds of a length of a blade of the first blades.

3. The vehicle according to claim 2, wherein the first and second blades borne by the first and second rotors are blades with variable pitches.

4. The vehicle according to claim 1, wherein the mechanical connection between the first crown and the at least some of the first blades includes at least one first rotor connecting rod and the mechanical connection between the second crown and the at least some of the second blades includes at least one second rotor connecting rod.

5. The vehicle according to claim 4, wherein the first and second crowns are positioned between the first and second blade planes.

6. The vehicle according to claim 1, wherein the first and second rotors are hollow and the vehicle includes a mast extending through the hollows of the first and second rotors.

7. The vehicle according to claim 2, further comprising a case encompassing the driving means, the case being comprised inside the cylinder-shaped space of maximum volume.

8. The vehicle according to claim 1, further comprising servomotors disposed between the first and second blade planes and adapted to alter respective positions of the first and second crowns with regard to the first and second blades.

9. The vehicle according to claim 1, further comprising a mechanical means connecting the first crown and the second crown and adapted to maintain the first crown and the second crown substantially parallel with each other.

10. A flying vehicle comprising:
- a first rotor mounted so as to rotate about an axis of rotation;
- first blades extending from the first rotor along a first blade plane;
- a second rotor mounted so as to rotate about the axis of rotation;
- second blades extending from the second rotor along a second blade plane;
- driving means for driving the vehicle, the driving means including first and second motors positioned between the first and second rotors and between the first and second blade planes, the first motor being connected to the first rotor so as to drive it into rotation about the axis of rotation and the second motor being connected to the second rotor so as to drive it into rotation about the axis of rotation;
- a first crown disposed around the axis of rotation and adapted to rotate about the axis of rotation with the first blades while being mobile relative to the first blades, at least some of the first blades being mechanically connected to the first crown so that movement of the first crown relative to the first blades causes a variation of incidence of the at least some of the first blades; and
- a second crown disposed around the axis of rotation and adapted to rotate about the axis of rotation with the second blades while being mobile relative to the second blades, at least some of the second blades being mechanically connected to the second crown so that movement of the second crown relative to the second blades causes a variation of incidence of the at least some of the second blades.

11. The flying vehicle according to claim 10, wherein the first and second motors have a size and a location such that it is comprised inside a cylinder-shaped space of maximum volume coaxial with the axis of rotation and with a radius of less than two thirds of a length of a blade of the first blades.

12. The flying vehicle according to claim 11, wherein the first and second blades borne by the first and second rotors are blades of variable pitches.

13. The vehicle according to claim 10, wherein the mechanical connection between the first crown and the at least some of the first blades includes at least one first rotor connecting rod and the mechanical connection between the second crown and the at least some of the second blades includes at least one second rotor connecting rod.

14. The vehicle according to claim 13, wherein the first and second crowns are positioned between the first and second blade planes.

15. The vehicle according to claim 10, further comprising a mechanical means connecting the first crown and the second crowns to each other and adapted to maintain the first and second crowns substantially parallel with each other.

16. The vehicle according to claim 10, wherein the first and second rotors are hollow and the vehicle includes a mast extending through the hollows of the first and second rotors.

17. The vehicle according to claim 11, further comprising a case encompassing the driving means, the case being comprised inside the cylinder-shaped space of maximum volume.

18. The vehicle according to claim 10, further comprising servomotors disposed between the first and second blade planes and adapted to alter respective positions of the first and second crowns with regard to the first and second blades.

* * * * *